United States Patent
Sanjotra et al.

(10) Patent No.: US 11,498,418 B2
(45) Date of Patent: Nov. 15, 2022

(54) POWER TAKE-OFF SHAFT SYSTEM AND AGRICULTURAL VEHICLE

(71) Applicant: DEERE & COMPANY, Moline, IL (US)

(72) Inventors: Bhupinder Singh Sanjotra, Ludhiana (IN); Christoph Eisenhardt, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 138 days.

(21) Appl. No.: 17/025,127

(22) Filed: Sep. 18, 2020

(65) Prior Publication Data

US 2021/0094414 A1 Apr. 1, 2021

(30) Foreign Application Priority Data

Sep. 30, 2019 (DE) .......................... 102019215041.1
Sep. 30, 2019 (DE) .......................... 102019215057.8

(51) Int. Cl.
*F16D 11/14* (2006.01)
*B60K 17/28* (2006.01)
(Continued)

(52) U.S. Cl.
CPC .............. *B60K 17/28* (2013.01); *A01B 71/06* (2013.01); *F16D 11/14* (2013.01); *F16D 25/061* (2013.01);
(Continued)

(58) Field of Classification Search
CPC ....... B60K 17/28; F16D 11/14; F16D 25/061; A01B 71/06
See application file for complete search history.

(56) References Cited

U.S. PATENT DOCUMENTS 3,352,165 A 11/1967 Lee
3,425,527 A 2/1969 Wolf
(Continued)

FOREIGN PATENT DOCUMENTS

DE 2802677 A1 7/1979
EP 0244378 A2 11/1987
(Continued)

OTHER PUBLICATIONS

European Search Report issued in counterpart application No. 20198653.6 dated Feb. 26, 2021 (08 pages).
(Continued)

*Primary Examiner* — Stacey A Fluhart (57) ABSTRACT

A power take-off shaft system includes an output shaft with a socket for a power take-off shaft stub located at one end of the output shaft. A control valve is arranged in the output shaft and includes a valve bore extending axially from the socket into the output shaft. A first piston is adjustably arranged inside the valve bore in the output shaft, and a shifting element is adjustably controlled by the first piston. A first gearwheel and a second gearwheel are disposed in engagement with the output shaft via the shifting element such that the first piston moves between a first position and a second position. The control valve includes a second piston arranged on the first piston, and the second piston is adjustable such that movement of the first piston into the second position is blocked by the second piston.

24 Claims, 3 Drawing Sheets

(51) Int. Cl.
*F16H 37/04* (2006.01)
*A01B 71/06* (2006.01)
*F16D 25/061* (2006.01)

(52) U.S. Cl.
CPC ..... *F16H 37/041* (2013.01); *F16H 2037/045* (2013.01)

(56) References Cited

U.S. PATENT DOCUMENTS

| | | | | |
|---|---|---|---|---|
| 4,271,942 | A | * | 6/1981 | Ballendux ............... F16D 21/04 |
| | | | | 192/48.91 |
| 4,287,778 | A | | 9/1981 | Quick |
| 4,722,234 | A | * | 2/1988 | Greene .................... G01P 13/00 |
| | | | | 74/DIG. 7 |
| 5,658,087 | A | * | 8/1997 | Butkovich ............... F16D 11/14 |
| | | | | 403/328 |
| 5,667,330 | A | * | 9/1997 | Henkel .................. B60K 17/28 |
| | | | | 403/328 |
| 6,076,643 | A | | 6/2000 | Brockschmidt |
| 6,854,541 | B2 | | 2/2005 | Matufuji et al. |
| 7,874,222 | B2 | | 1/2011 | Steele et al. |
| 8,127,632 | B2 | | 3/2012 | Buhrke |
| 8,534,396 | B2 | * | 9/2013 | Schulz ................... B60K 17/28 |
| | | | | 180/53.6 |
| 9,260,010 | B2 | | 2/2016 | Neumann |
| 2015/0251537 | A1 | | 9/2015 | Ruokola |
| 2016/0281821 | A1 | | 9/2016 | Matsuura et al. |

FOREIGN PATENT DOCUMENTS

| | | |
|---|---|---|
| EP | 1983217 A1 | 10/2008 |
| EP | 2922721 A1 | 9/2015 |
| WO | WO2014079746 A1 | 5/2014 |

OTHER PUBLICATIONS

European Search Report issued in counterpart application No. 20198655.1 dated Feb. 26, 2021 (08 pages).

* cited by examiner

POWER TAKE-OFF SHAFT SYSTEM AND AGRICULTURAL VEHICLE

RELATED APPLICATIONS

This application claims priority to German Patent Application Ser. No. 102019215041.1, filed Sep. 30, 2019, and German Patent Application Ser. No. 102019215057.8, filed Sep. 30, 2019, the disclosures of which are hereby incorporated by reference in their entirety.

FIELD OF THE DISCLOSURE

The present disclosure relates to an agricultural vehicle, and in particular to a power take-off shaft system of an agricultural vehicle.

BACKGROUND

Generally, power take-off shaft systems are provided at the front or rear end of agricultural vehicles such as traction vehicles, tractors or towing vehicles. In particular, the power take-off shaft systems comprise a drivable output shaft and a power take-off shaft stub, a device drive shaft being able to be fastened thereto and a working tool or an attachment being able to derive a torque therefrom. Typical working tools which require a drive, are balers, circular harrows and sprayers.

Conventional power take-off shaft systems, in particular multi-stage power take-off shaft systems, may provide different speeds or permit a shifting of the operating modes of the power take-off shaft systems in the load-free state. Modern power take-off shaft systems may have between 1 to 4 gears. Moreover, the use of power take-off shaft stubs with toothings having 6, 21, 20 or 22 teeth is carried out in accordance with ISO 500, in which the power take-off shaft stubs are categorized according to a type 1-4. A different geometry has to be provided depending on the transmitted power. In particular, agricultural vehicles may be provided with power take-off shaft systems which have two gears, namely a first gear with an output speed of 540 r/min and a second gear with an output speed of 1000 r/min at the rated engine speed of the tractor. A power take-off shaft stub which is operated at 540 r/min in this case may have a toothing with 6 teeth and a power take-off shaft stub which is operated at 1000 r/min may have a toothing with 20 or 21 teeth. The variable design of the power take-off shaft stub for the different operating speeds may serve to protect against the inadvertent attachment of a device designed for 540 r/min to a vehicle which is designed for 1000 r/min.

In spite of this difference in the design of the power take-off shaft system, in particular the power take-off shaft stub, the operator is still advised to activate the correct output speed for the working tool, whereby a risk is present of incorrectly selecting the transmission ratio and the resulting damage to the power take-off shaft system or the working tool. The power take-off shaft system may be actuatable by an electric switch or software. Moreover, sensors are additionally provided on the power take-off shaft system in order to identify which end of the power take-off shaft stub or which power take-off shaft stub is arranged on the power take-off shaft system. A further possibility is to mechanically block the first or second gear if the operator attempts to activate the incorrect output speed for the attached working tool. EP 2 922 721 A1 discloses such a power take-off shaft system.

The problems of the conventional power take-off shaft systems or vehicles are that they require too much constructional space and are cost-intensive. Moreover, the power take-off shaft systems are structurally complex since, in particular, these systems require sensors for identifying the power take-off shaft stub. As a result, the power take-off shaft systems are susceptible to repair and have a high level of wear.

Thus, there is a need for a power take-off shaft system and an agricultural vehicle which substantially avoid the drawbacks known from the prior art and are of structurally simple design or have a reduced susceptibility to repair or a lower level of wear.

SUMMARY

In the present disclosure, a power take-off shaft system for an agricultural vehicle is proposed. The power take-off shaft system includes an output shaft with a socket for a power take-off shaft stub which is provided at one end of the output shaft, where the power take-off shaft stub is able to be arranged at least partially, and in some embodiments entirely, in the socket. Thus, the power take-off shaft system may comprise the power take-off shaft stub. The output shaft comprises a control valve which is arranged, i.e., integrated, in the output shaft. The output shaft, in particular the control valve, comprises a valve bore which extends axially from the socket, in particular from a base of the socket, into the output shaft. The output shaft, in particular the control valve, further comprises a first piston which is arranged so as to be adjustable, i.e., movable or displaceable or settable, inside the valve bore in the output shaft. The power take-off shaft system, including the output shaft, further comprises a shifting element which is adjustable, e.g., also settable or movable or displaceable, by the first piston.

The power take-off shaft system further comprises a first gearwheel and a second gearwheel which are able to be brought into engagement, e.g., fixedly in terms of rotation, with the output shaft by the shifting element. The first piston in this case is adjustable, i.e., movable or displaceable or even settable, in particular in an axial direction of the output shaft, between a first position in which the first piston adjusts the shifting element such that the first gearwheel is engaged with the shifting element and a second position in which the first piston adjusts the shifting element such that the second gearwheel is engaged with the shifting element. The output shaft, in particular the control valve, has a second piston which is arranged so as to be adjustable, e.g., movable, displaceable or settable so as to be axially movable or displaceable, at least partially on, the first piston, for example, inside a piston bore in the first piston. The second piston may also be arranged so as to be adjustable, i.e., arranged so as to be axially movable or displaceable, inside the valve bore in the output shaft. The second piston is adjustable such as, for example, inside the piston bore by the power take-off shaft stub, and also depending on an alignment of the power take-off shaft stub in the socket. Here, a movement of the first piston into the second position is blocked by the second piston, i.e., in particular an adjustment of the shifting element is also at least partially prevented.

In other words, the first piston may be blocked by the second piston depending on an alignment or arrangement of the power take-off shaft stub in the socket. Thus, by the power take-off shaft stub, the second piston may be adjustable (e.g., displaceable or movable) between a first position in which the second piston at least partially protrudes into the socket and the second piston is able to be received at least partially in a recess of the power take-off shaft stub, and a second position in which the power take-off shaft stub adjusts the second piston such that this second piston blocks the first piston so that a movement of the first piston into the second position is prevented.

In particular, the power take-off shaft stub may have a first stub end with a first profile (or recess) and a first toothing or a second stub end with a second profile and a second toothing. The power take-off shaft stub may thus be a short shaft with one or two or more toothings, one for the drive and one for the output. In the case of a reversible power take-off shaft stub, a third toothing may be provided for adapting to different splined articulated shafts. Instead of a reversible power take-off shaft stub, two or more power take-off shaft stubs may also be interchanged. The power take-off shaft stub with the first stub end may be arranged in the socket, wherein the recess at the first stub end is able to receive the second piston which protrudes at least partially into the socket. In this case, the first piston may be adjustable into the first and the second position. However, the power take-off shaft stub may also be arranged with the second stub end in the socket, wherein the second piston protruding into the socket is adjusted from the second stub end in the direction of the first piston. In this case, the first piston may be adjusted only into the first position and an adjustment of the first piston into the second position is blocked by the second piston. In principle, however, two power take-off shaft stubs may be provided, in each case with a profile and a toothing on one respective first stub end. The socket may also include a releasable closure mechanism for securing the power take-off shaft stub.

The power take-off shaft system may be a multi-stage power take-off shaft system. The power take-off shaft system or the multi-stage power take-off shaft system may be for an agricultural vehicle such as a traction vehicle or a tractor, towing vehicle or the like. Generally, the power take-off shaft system may be arranged on the agricultural vehicle such as at the front, the rear or centrally. The power take-off shaft system may comprise a power take-off shaft controller or an input shaft. The power take-off shaft system may comprise a first and a second gearwheel pair. The first gearwheel pair may comprise the first gearwheel and a third gearwheel. The second gearwheel pair may comprise the second gearwheel and a fourth gearwheel. The third or fourth gearwheel may be connected in this case fixedly in terms of rotation to the input shaft. Similarly, however, the power take-off shaft system may also comprise three or four or more gearwheel pairs, wherein at least one gearwheel per gearwheel pair is shiftable. Each gearwheel pair may comprise at least one gearwheel which is connected to the input shaft and comprise a further gearwheel which is able to be connected fixedly in terms of rotation to the output shaft by the shifting element.

The input shaft may be arranged with the output shaft between an engine output and the power take-off shaft stub. The input shaft may be operatively connected to the output shaft by a gearwheel pair. In particular, the input shaft may be operatively coupled or may be couplable to the output shaft by the first or second gearwheel pair.

The shifting element may be arranged on the outer surface of the output shaft. The shifting element may be engaged, e.g., engaged fixedly in terms of rotation, with the output shaft. The shifting element may be connected or coupled to the first piston such as part of the first piston or fastened to the first piston. The shifting element permits a gearwheel, i.e., the first or second gearwheel, to be connected fixedly in terms of rotation to the output shaft, i.e., to operate the power take-off shaft system with at least two gears. In this case, the first position may correspond to the first gear and the second position may correspond to the second gear. With an arrangement which operates two gearwheels with one shifting element, a compact design may be implemented. Two or more shifting elements may also be provided, i.e., the output shaft may have a first and a second shifting element by which the first and second gearwheel are individually shiftable. In particular, however, the input shaft may also have a third shifting element.

However, the shifting element may also be adjustable (i.e., movable, displaceable, or settable) by the first or second piston into a neutral position. In particular, the first piston and thus also the shifting element may be adjustable by the second piston into the neutral position. In the neutral position, the shifting element is not able to be engaged with a gearwheel, in particular neither with the first nor the second gearwheel. Thus the shifting element may be configured or arranged such that it permits the gearwheels to be connected fixedly in terms of rotation to the output shaft or to operate this in the neutral position in freewheel mode. Thus the first piston may be displaceable in the axial direction of the output shaft between the first position or the second position or the neutral position so that the shifting element is also adjustable in the axial direction of the output shaft. If the piston is in the first position in which the first piston adjusts the shifting element such that the first gearwheel is engaged with the shifting element, the power take-off shaft system may be operated in the first gear at the lower speed, e.g., 540 r/min. If the piston is in the second position in which the first piston adjusts the shifting element such that the second gearwheel is engaged with the shifting element, the power take-off shaft system may be operated in the second gear at the higher speed, e.g., 1000 r/min. The first piston, however, may also be adjustable between a third or fourth position or a plurality of positions. In the third position the first piston may adjust the shifting element such that a third gearwheel is engaged with the shifting element. In the fourth position, the first piston may adjust the shifting element such that a fourth gearwheel is engaged with the shifting element.

The two-part construction of the piston, which provides a mechanism for blocking the second position of the first piston, i.e., of the gear at the higher speed, is part of the present disclosure. Advantageously, the engagement of the power take-off shaft stub at a higher speed may be automatically prevented thereby, depending on an alignment of the power take-off shaft stub in the socket or the type of power take-off shaft stub. As a result, the reliability of the power take-off shaft system may be improved and the use of sensors avoided. This represents an improvement in the safety of the power take-off shaft system and requires the power take-off shaft stub to be arranged in the correct orientation or the correct type of power take-off shaft stub to be arranged in the socket before a corresponding speed may be activated. Moreover, the output shaft, in particular the control valve, is of structurally simpler design. Moreover, the susceptibility to repair or the wear of the power take-off shaft system may be advantageously reduced.

In one embodiment of the present disclosure, the second piston comprises a first piston element, a second piston element, and a third piston element, wherein the first piston element is arranged so as to be adjustable at least partially in the first piston, the second piston element is arranged so as to be adjustable at least partially in the first piston element and the third piston element is arranged so as to be adjustable at least partially in the second piston element. The first, second and third piston elements may be arranged so as to be adjustable, particularly so as to be axially movable or displaceable. The first piston element may be arranged, for example, so as to be adjustable inside the piston bore in the first piston. Moreover, the first piston element may also be arranged so as to be adjustable so as to be axially movable or displaceable inside the valve bore in the output shaft. The second piston element may be arranged, for example, so as to be adjustable inside a further piston bore in the first piston element. Moreover, the second piston element may also be arranged so as to be adjustable so as to be axially movable or displaceable inside the valve bore in the output shaft. The third piston element may be arranged so as to be adjustable at least partially inside a third piston bore in the second piston element. Moreover, the third piston element may protrude at least partially into the socket or the further piston bore or may be also arranged so as to be adjustable so as to be axially movable or displaceable inside the valve bore in the output shaft.

The third piston element may be connected to the first piston. The third piston element may be adjustable by the power take-off shaft stub depending on an alignment of the power take-off shaft stub in the socket such that a movement of the first piston into the second position is blocked by the first and second and third piston element, i.e., in particular an adjustment of the shifting element is also prevented. This measure permits greater damping of the mechanism so that the susceptibility to repair or the wear is reduced.

In one embodiment of the present disclosure, the second piston element is mounted in the first piston element by a first restoring element, such as in a balanced position, or the third piston element comprises a first and second piston part which are arranged so as to be adjustable in the second piston element, wherein a second restoring element is arranged between the first and second piston part, in particular the first and second piston part are mounted by the second restoring element in a balanced position. The first or second restoring element may be a resilient element, in particular a spring element or a spring. The first or the second restoring element may be in a balanced or resting position in the neutral position.

The first restoring element is able to pretension the first or second piston element such that the first piston is adjustable back into the neutral position by the first restoring element. The first piston may be adjustable, in particular by the first restoring element, from the first and second position back into the neutral position. The second restoring element is able to pretension the third piston element such that the first piston is adjustable back into the neutral position by the second restoring element. When the first piston is adjusted into the first or second position, the second piston element may be pretensioned by the first restoring element in the first piston element. When the first piston is adjusted into the first or second position, the third piston element may be pretensioned by the second restoring element in the second piston element. The first and second piston part may be connected together by the second restoring element or coupled by the second restoring element, in particular the second restoring element may be fastened at least partially to the first and second piston part. The second restoring element and the first and second piston part may be arranged along an axis of the output shaft, in particular coaxially along the axis of the output shaft. The first piston part may be connected to the first piston, in particular coupled to the first piston or fastened thereto. The second piston part may protrude into the socket.

The first piston part may be adjustable, e.g., settable or displaceable, by the power take-off shaft stub depending on an alignment of the power take-off shaft stub in the socket, such that the second restoring element pretensions the first and second piston part and a movement of the first piston into the second position is blocked by the first and second piston element and the first and second piston part, i.e., in particular an adjustment of the shifting element is also prevented. The first and second restoring element permit a greater damping of the power take-off shaft system and an automatic mechanical controllability.

In one embodiment of the present disclosure, a first fluid conveyance bore is provided in the output shaft, in particular at least partially in the output shaft and at least partially in the first piston, a pressurized hydraulic fluid being able to be conveyed thereby into the output shaft such as through the valve bore, whereby the first piston is moved into the first position or a second fluid conveyance bore is provided in the output shaft, the pressurized fluid being able to be conveyed thereby into the output shaft such that the first piston is moved into the second position. The control valve may comprise the first and second fluid conveyance bore. The first fluid conveyance bore may be in two parts. The first fluid conveyance bore may be thus be configured at least partially in the output shaft and at least partially in the first piston. In this case, the part of the first fluid conveyance bore which is configured in the piston may be arranged at least partially in the part of the first fluid conveyance bore which is configured in the output shaft. The part of the first fluid conveyance bore which is arranged in the output shaft, therefore, may have a different diameter, in particular a greater diameter, than the part of the first fluid conveyance bore which is arranged in the first piston.

The pressurized fluid may be guided in the first fluid conveyance bore via the output shaft into the first piston in the piston bore such that the first piston is moved into the first position. The piston bore may in this case be configured at least partially, but also entirely, as the first chamber and filled with the pressurized fluid so that the first piston is moved into the first position. The pressurized fluid may be guided in the second fluid conveyance bore via the output shaft between the first piston and the base of the valve bore so that the first piston is moved into the second position. The volume between the first piston and the base of the valve bore may be configured in this case at least partially, but also entirely, as the second chamber and filled with the pressurized fluid so that the first piston is moved into the second position. The power take-off shaft system or the agricultural vehicle may also comprise a mechanism, for example, hoses, tubes, lines, or a pump, for supplying the fluid to the respective conveyance bore. The first or second position may thus be activated by the pressurized fluid, which is able to be conveyed through the first or second fluid conveyance bore in the output shaft. Advantageously, this permits a structurally simpler design of the power take-off shaft system, since mechanical connections in the form of shifting rods, shift forks, gear shift linkages are dispensed with in the gear unit. By the provision of the first and second fluid conveyance bore in the output shaft the mechanism for selecting the first and second gearwheel may be controlled in a simple manner, in particular hydraulically. Due to the structurally optimized design, the power take-off shaft system has a longer service life and is easier to operate.

In one embodiment of the present disclosure, the power take-off shaft stub has a first and second stub end. The first and second stub end are able to be arranged at least partially, in particular entirely, in the socket and the first stub end comprises a toothing which is different from the second stub end. The first stub end may have a first toothing with 6, 21, 22, or 22 teeth or a cylindrical shape without teeth. The second stub end may have a second toothing with 6, 21, 22 or 22 teeth or a cylindrical shape without teeth. The toothing with 6 teeth may have a 1⅜ inch or 1¾ inch splined shaft profile. The toothing with 20 or 21 teeth may have a splined shaft profile with a 35 mm diameter and the toothing with 21 teeth may have a splined shaft profile with a 45 mm diameter. Moreover, a toothing with 22 teeth which has a splined shaft profile with a 57.5 mm diameter may be used. Advantageously, it is possible to identify which stub end is arranged in the socket, according to the arrangement of the respective toothing in the socket.

In one embodiment of the present disclosure, the first stub end, e.g., a base of the first stub end, has a first profile with a recess and the second stub end, e.g., a base of the second stub end, has a second profile which is planar, i.e., it has no recess. The first profile of the first stub end may at least partially receive the protruding second piston part, i.e., due to the recess, when this second piston part is arranged in the recess. As a result, the first piston is not blocked and thus may be adjusted into the first and second position. The second stub end with the second profile may adjust the second piston part, in particular displace the second piston part, in the direction of the first piston part such that by the first piston part a movement of the first piston is blocked, i.e., an adjustment of the shifting element into the second position is prevented.

Moreover, the second stub end with the second profile may adjust the second piston part, in particular displace the second piston part, in the direction of the first piston part such that the first piston part is pretensioned by the second restoring element. In particular, when the first stub end, which has a recess and the first toothing in particular with 6 teeth, is arranged in the socket, therefore, the first piston is adjustable into the first and second position so that an activation of the lower speed (540 or 1000 revolutions per minute) and the higher speed (1000 or 1300 revolutions per minute) is possible. In particular, when the second stub end which has no recess and the second toothing, in particular with 21 teeth or a cylindrical shape, is arranged in the socket, the first piston may be adjustable only into the first position so that only an activation of the lower speed is possible and no activation of the higher speed is possible. This advantageously makes it possible to create a power take-off shaft system which is structurally less susceptible to repair and wear.

The present disclosure further relates to an agricultural vehicle having a power take-off shaft system. The agricultural vehicle may be a traction vehicle, tractor or towing vehicle. The power take-off shaft system may be arranged on the vehicle at the front or in the center or at the rear in the direction of travel of the vehicle. In specific embodiments, the agricultural vehicle may comprise a power take-off shaft system in order to provide power to a working tool via an articulated shaft. The agricultural vehicle according to the present disclosure may have the above-described advantages of the power take-off shaft system.

The power take-off shaft system according to the present disclosure or the agricultural vehicle may have a control device, in particular two or more control devices, which may be operated to control or regulate, i.e., to set or to alter, the power take-off shaft system or the agricultural vehicle. This may include the control valve, particularly such that the first piston is adjustable between the first and second position and the neutral positon. Moreover, the power take-off shaft system or the agricultural vehicle may be controllable or regulatable by the control unit. The control unit (ECU=electronic control unit or ECM=electronic control module) may be an electronic module or an embedded system. The control unit may be provided on the power take-off shaft system or the agricultural vehicle. The control unit may also be allocated between the power take-off shaft system and the agricultural vehicle. The control unit and the power take-off shaft system or the agricultural vehicle, in particular a first or second valve for controlling or regulating the supply of fluid into the first and second fluid conveyance bore, may be connected together by a cable or wire, or even wirelessly, i.e., for example by radio.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
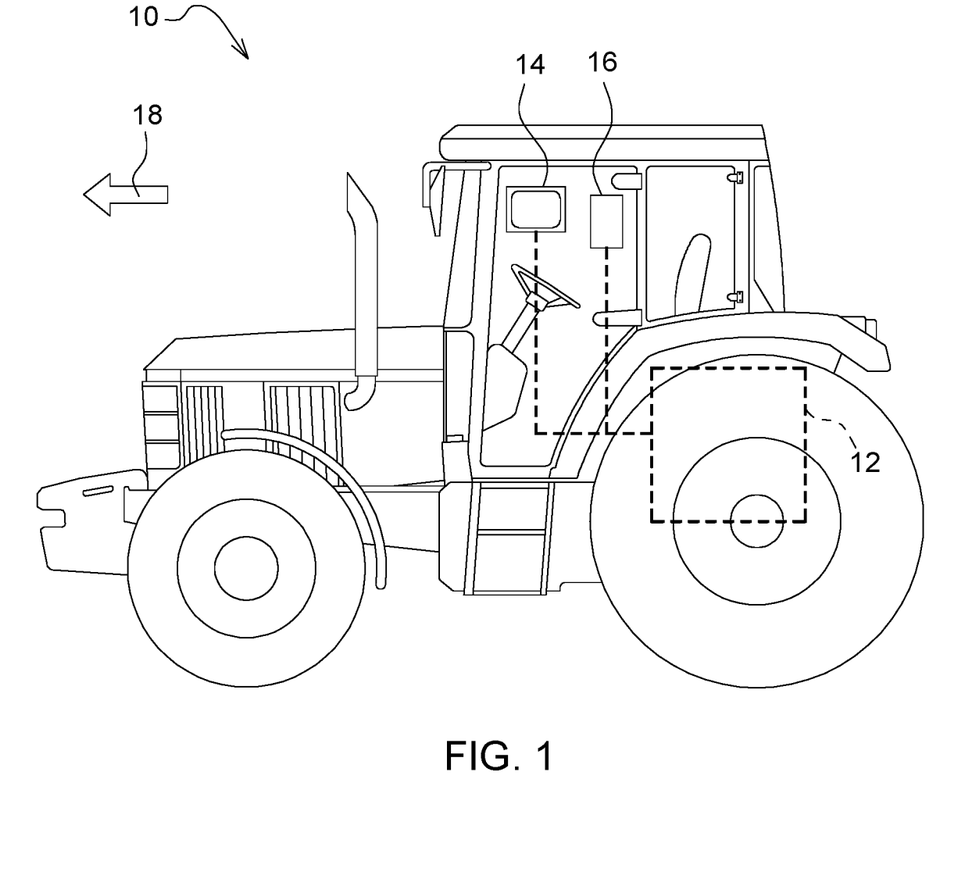
FIG. 1 shows a schematic side view of a first embodiment of an agricultural vehicle according to the present disclosure.

FIG. 1 shows a schematic side view of a first embodiment of the agricultural vehicle 10 according to the present disclosure which is able to move in the forward direction of travel 18. The vehicle 10, shown schematically in FIG. 1, comprises a power take-off shaft system 12 according to the present disclosure. The power take-off shaft system 12 may be used in order to permit a supply of driving power to a working tool. On such a vehicle 10 the power take-off shaft system 12 is generally provided on the vehicle 10 at the front, in the center or at the rear in the forward direction of travel, in FIG. 1 it is provided at the rear.

A working tool may be coupled and attached to the vehicle 10 and the power take-off shaft system 12. Conventional speeds of the power take-off shaft system 12 are 540 or 1000 or 1300 revolutions per minute. It is also possible to operate the power take-off shaft system 12 at the cited speeds in a reduced power mode. The agricultural vehicle 10 may have a control device 16 or a display device 14. The control device 16, however, may also be configured as a part of the power take-off shaft system 12.

Figure 2:
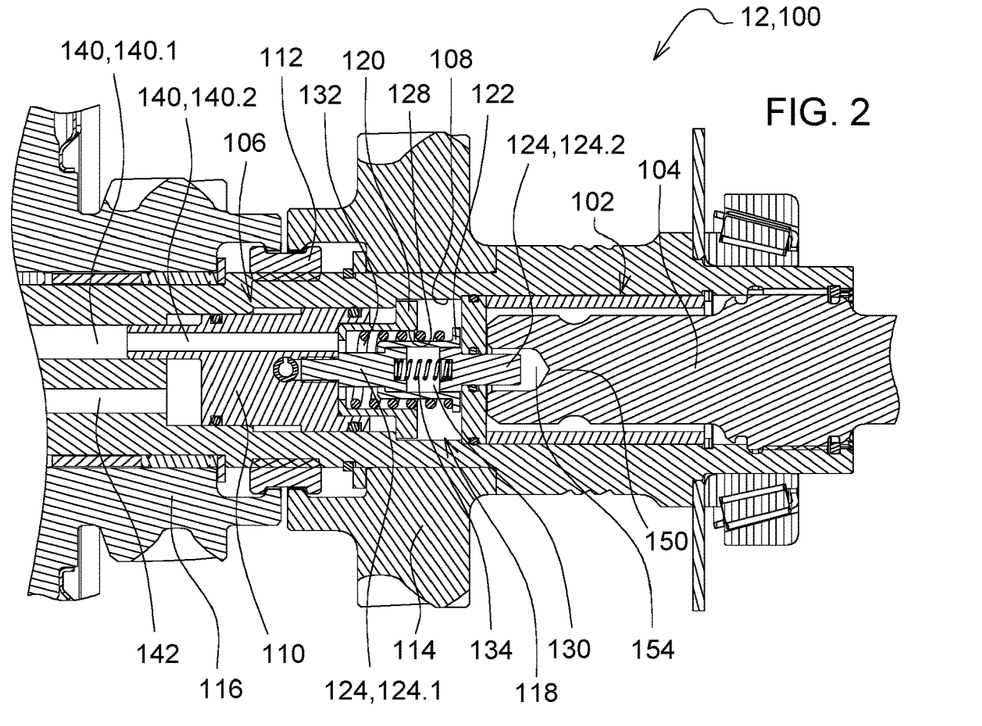
FIG. 2 shows a schematic view of a power take-off shaft system according to the present disclosure with a first piston in a neutral position.

FIG. 2 shows a schematic view of a power take-off shaft system 12 according to the present disclosure, in particular parts of the power take-off shaft system 12, with a first piston 110 in a neutral position. The power take-off shaft system 12 shown in FIG. 2 corresponds substantially to the power take-off shaft system 12 shown in FIG. 1 so that hereinafter only the differences are described. The power take-off shaft system 12 comprises an output shaft 100 with a socket 102 for a power take-off shaft stub 104 provided at one end of the output shaft, wherein the power take-off shaft stub 104 is able to be arranged at least partially in the socket 102. Moreover, the output shaft 100 comprises a control valve 106 which is arranged in the output shaft 100. The output shaft 100, in particular the control valve 106, comprises a valve bore 108 which extends axially from the socket 106 into the output shaft 100 and comprises a first piston 110 which is adjustably arranged inside the valve bore 108 in the output shaft 100.

Moreover, a shifting element 112 which is adjustable by the first piston 110 is provided. The shifting element 112 is also connected to the first piston 110 and is engaged fixedly in terms of rotation with the output shaft 100. The power take-off shaft system 12 further comprises a first gearwheel 114 and a second gearwheel 116 which are able to be brought into engagement, in particular are able to brought into engagement fixedly in terms of rotation, with the output shaft 100 by the shifting element 112. The first piston 110 is adjustable between a first position in which the first piston 110 adjusts the shifting element 112 such that the first gearwheel 114 is engaged with the shifting element 112, and a second position in which the first piston 110 adjusts the shifting element 112 such that the second gearwheel 116 is engaged with the shifting element 112. The output shaft 100, in particular the control valve 106, has a second piston 118 which is arranged so as to be adjustable or displaceable at least partially on the first piston 110, wherein the second piston 118 is arranged so as to be adjustable or displaceable at least partially in the first piston 110 inside a piston bore (reference numeral 126 see FIG. 3). The second piston 118 is adjustable by the power take-off shaft stub 104 such that a movement of the first piston 110 into the second position is blocked by the second piston 118.

As shown in FIG. 2, the first piston 110 is also adjustable, movable or displaceable into a neutral position in which the shifting element 112 is engaged neither with the first nor with the second gearwheel 114, 116.

If the shifting element 112 is engaged with the first or second gearwheel 114, 116 it connects these gearwheels fixedly in terms of rotation to the output shaft 100. If the first piston 110 is in the first position the power take-off shaft system 12 may be operated at one speed, in particular the lower speed (540 r/min). If the first piston 110 is in the second position, the power take-off shaft system 12 may be operated at a different speed, in particular the higher speed. The second piston 118 comprises a first piston element 120, a second piston element 122 and a third piston element 124. The first piston element 120 is adjustably arranged at least partially in the first piston 110 inside the piston bore (reference numeral 126, see FIG. 3). The second piston element 122 is adjustably arranged at least partially in the first piston element 120 inside a further piston bore 128. Moreover, the second piston element 122 is mounted in the first piston element 120 by a first restoring element 132.

The third piston element 124 is adjustably arranged at least partially in the second piston element 122 inside a third piston bore 130. The third piston element 124 comprises a first and second piston part 124.1, 124.2 which are adjustably arranged in the second piston element 122 inside the third piston bore 130, wherein a second restoring element 134 is arranged between the first and second piston part 124.1, 124.2. The first piston part 124.1 is coupled to the first piston 110 and the second piston part 124.2 protrudes into the socket 102. The first and second restoring element 132, 134 are configured as a resilient element, in this case a spring. If the first piston 110 is located in the neutral position, the first or second restoring element 132, 134 may be in a balanced or resting position.

Moreover, a first fluid conveyance bore 140 is provided at least partially in the output shaft 100 and at least partially in the first piston 110, a pressurized fluid being able to be conveyed thereby into the output shaft 100 such that the first piston 110 is moved into the first position. The first fluid conveyance bore is thus configured in two parts, wherein the part of the first fluid conveyance bore 140.2 which is configured in the piston 110 is arranged at least partially in the part of the first fluid conveyance bore 140.1 which is configured in the output shaft 100. Moreover, a second fluid conveyance bore 142 is configured in the output shaft 100, the pressurized fluid being able to be conveyed thereby into the output shaft 100 such that the first piston 110 is moved into the second position.

The power take-off shaft stub 104 has a first stub end 150 and a second stub end (reference numeral 152, see FIG. 5) which may be at least partially arranged in the socket. The first stub end 150 has a toothing which is different from the second stub end 152. The first stub end 150 may, for example, have a first toothing with 6 teeth and the second stub end 152 may have a second toothing with 21 teeth. Moreover, the first stub end 150 comprises a first profile with a recess 154 and the second stub end 152 comprises a second profile which is planar (see FIG. 5).

Figure 3:
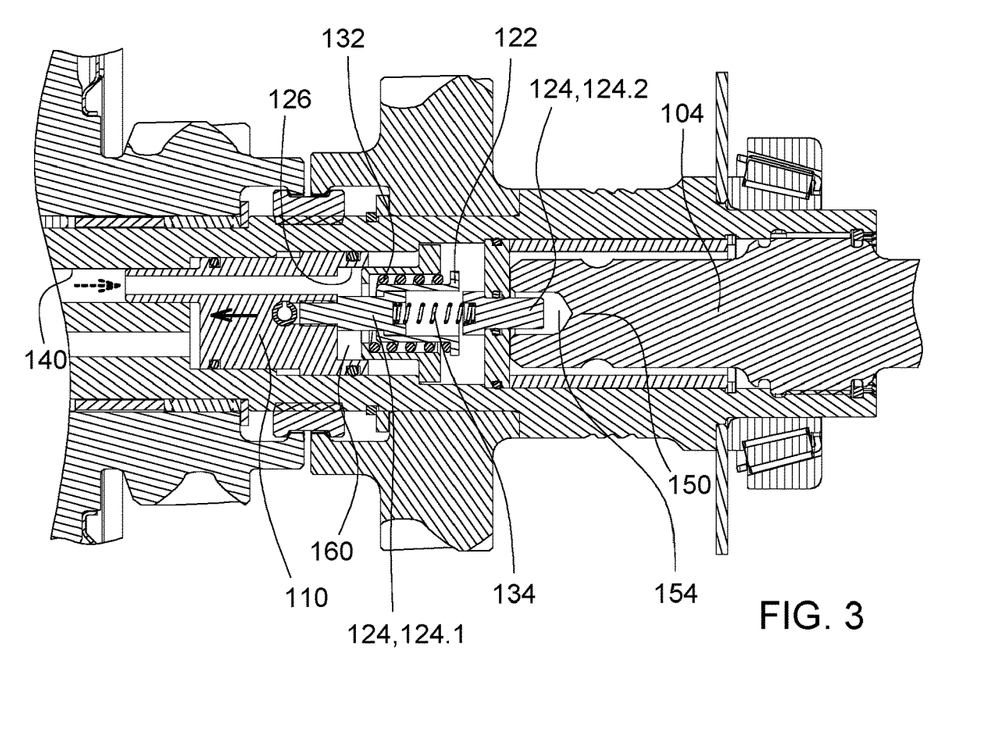
FIG. 3 shows a schematic view of a power take-off shaft system according to the present disclosure with the piston in the first position.

FIG. 3 shows a schematic view of a power take-off shaft system 12 according to the present disclosure, in particular parts of the power take-off shaft system 12 with the first piston 110 in the first position. The power take-off shaft system 12 shown in FIG. 3 substantially corresponds to the power take-off shaft system shown in FIGS. 1 and 2 so that only the differences are described hereinafter. The piston bore 126 is configured as a first chamber 160. If the first chamber 160 is filled with the pressurized fluid, the first piston 110 is moved into the first position. In this case, the first restoring element 132 pretensions the first piston element 120 such that the first piston 110 is adjustable back into the neutral position by the first restoring element 132. Moreover, the second restoring element 134 may additionally pretension the third piston element 124 such that the first piston 110 is also adjustable into the neutral position by the second restoring element 134. Moreover, the power take-off shaft stub 104 with the first stub end 150 with the first profile and the first toothing is arranged in the socket 102, wherein the recess 154 on the first stub end 150 receives the second piston part 124.2 which protrudes into the socket 102.

Figure 4:
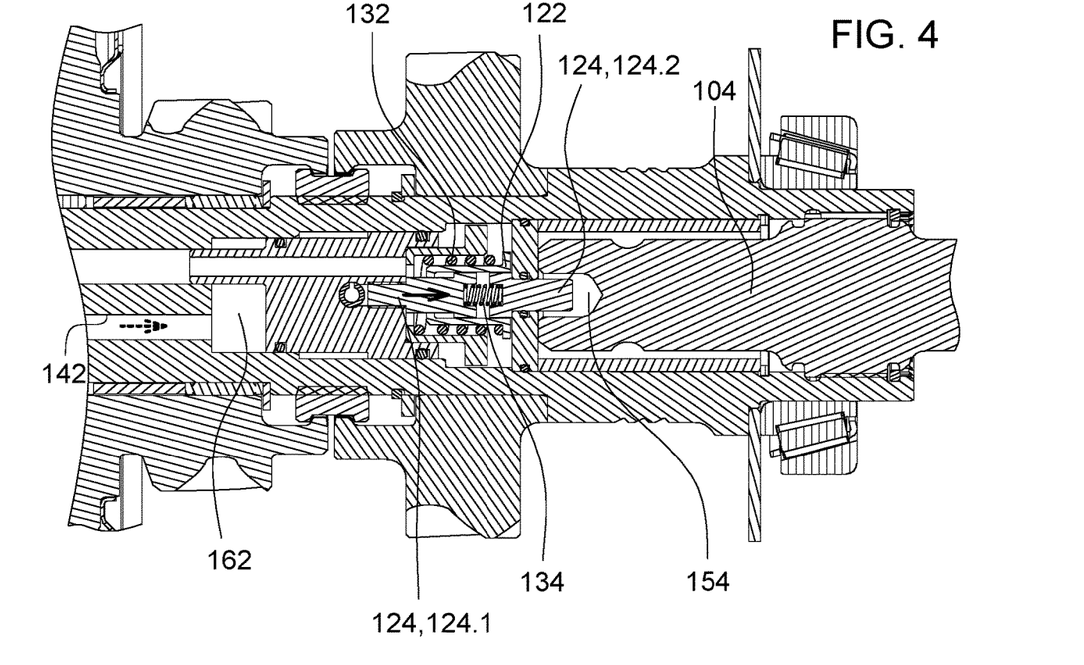
FIG. 4 shows a schematic plan view of the power take-off shaft system with the first piston in the second position.

FIG. 4 shows a schematic plan view of the power take-off shaft system 12, in particular parts of the power take-off shaft system 12 with the first piston 110 in the second position. The power take-off shaft system 12 shown in FIG. 4 corresponds substantially to the power take-off shaft system 12 shown in FIGS. 1 to 3, so that only the differences are described hereinafter. The pressurized fluid may be guided in the second fluid conveyance bore 142 via the output shaft 100 into the volume which is located between the first piston 110 and the base of the valve bore 108 and which is configured as the second chamber 162. If the second chamber 162 is filled with the pressurized fluid, the first piston 110 is moved into the second position. In this case the first restoring element 132 pretensions the first and second piston element 120, 122, but in particular the first piston element 120, such that the first piston 110 is adjustable back into the neutral position by the first piston element 120 which is pretensioned by the first restoring element 132. Moreover, the second restoring element 134 may additionally pretension the third piston element 124 such that the first piston 110 is also adjustable back into the neutral position by the second restoring element 134.

Figure 5:
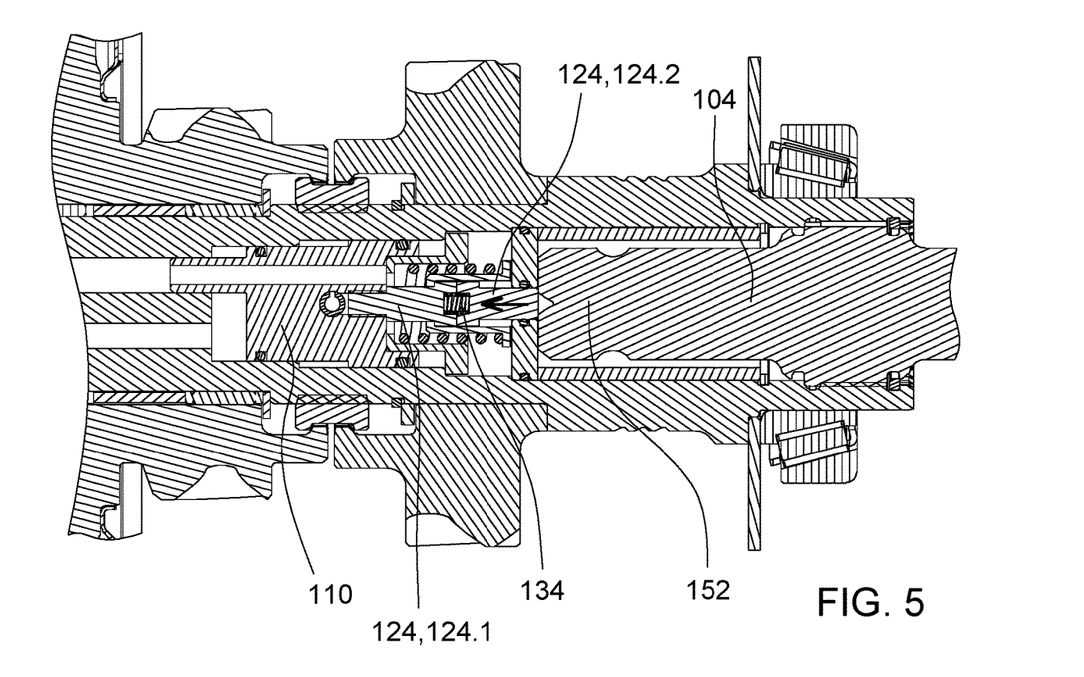
FIG. 5 shows a schematic plan view of the power take-off shaft system with the first piston in the neutral position and a blocked second position.

FIG. 5 shows a schematic plan view of the power take-off shaft system 12, in particular parts of the power take-off shaft system 12, with the first piston 110 in the neutral position and a blocked second position. The power take-off shaft system 12 shown in FIG. 5 substantially corresponds to the power take-off shaft system 12 shown in FIGS. 1 to 4, so that only the differences are described hereinafter. The primary difference from the power take-off shaft systems 12 shown in FIGS. 1 to 4 is that the power take-off shaft stub 104 with the second stub end 152 with the second profile and the second toothing is arranged in the socket 102, wherein the second piston part 124.2 protruding into the socket 102 is adjusted by the second stub end 152 in the direction of the first piston part and along an axis of the third piston element 124.

In this case, the second restoring element 134 pretensions the third piston element 124, i.e., thus the second piston 118 and the components thereof as a whole, such that an adjustment of the first piston 110 into the second position is blocked by the second piston 118.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A power take-off shaft system for an agricultural vehicle, comprising:
an output shaft with a socket for a power take-off shaft stub located at one end of the output shaft, wherein the power take-off shaft stub is arranged at least partially in the socket;
a control valve arranged in the output shaft and including a valve bore extending axially from the socket into the output shaft;
a first piston adjustably arranged inside the valve bore in the output shaft;
a shifting element adjustably controlled by the first piston; and
a first gearwheel and a second gearwheel disposed in engagement with the output shaft via the shifting element;
wherein the first piston is adjustable between a first position and a second position;
wherein, in the first position, the first piston adjusts the shifting element such that the first gearwheel is engaged with the shifting element;
wherein, in the second position, the first piston adjusts the shifting element such that the second gearwheel is engaged with the shifting element;
wherein the control valve comprises a second piston adjustably arranged at least partially on the first piston and the second piston is adjustable by the power take-off shaft stub such that a movement of the first piston into the second position is blocked by the second piston; and
wherein the second piston comprises a first piston element, a second piston element, and a third piston element.

2. The power take-off shaft system of claim 1, wherein:
the first piston element is adjustably arranged at least partially in the first piston;
the second piston element is adjustably arranged at least partially in the first piston element; and
the third piston element is adjustably arranged at least partially in the second piston element.

3. The power take-off shaft system of claim 1, wherein the second piston element is mounted in the first piston element by a first restoring element.

4. The power take-off shaft system of claim 1, wherein the third piston element comprises a first and second piston part adjustably arranged in the second piston element.

5. The power take-off shaft system of claim 4, wherein a second restoring element is arranged between the first and second piston part.

6. The power take-off shaft system of claim 1, further comprising a first fluid conveyance bore defined in the output shaft.

7. The power take-off shaft system of claim 6, wherein a pressurized fluid is conveyed through the first fluid conveyance bore into the output shaft such that the first piston is moved into the first position.

8. The power take-off shaft system of claim 7, further comprising a second fluid conveyance bore in the output shaft, wherein the pressurized fluid is conveyed through the second fluid conveyance bore into the output shaft such that the first piston is moved into the second position.

9. The power take-off shaft system of claim 1, wherein the power take-off shaft stub comprises a first stub end and a second stub end arranged at least partially in the socket.

10. The power take-off shaft system of claim 9, wherein the first stub end comprises a toothing which is different from the second stub end.

11. The power take-off shaft system of claim 9, wherein the first stub end comprises a first profile with a recess and the second stub end comprises a second profile which is planar.

12. An agricultural vehicle, comprising:
a power take-off shaft system coupled to the vehicle;
a working tool coupled to the power take-off shaft system;
wherein, the power take-off shaft system comprises:
an output shaft with a socket for a power take-off shaft stub located at one end of the output shaft, wherein the power take-off shaft stub is arranged at least partially in the socket,
a control valve arranged in the output shaft and including a valve bore extending axially from the socket into the output shaft;
a first piston adjustably arranged inside the valve bore in the output shaft;
a shifting element adjustably controlled by the first piston; and
a first gearwheel and a second gearwheel disposed in engagement with the output shaft via the shifting element;
wherein the first piston is adjustable between a first position and a second position;

wherein, in the first position, the first piston adjusts the shifting element such that the first gearwheel is engaged with the shifting element;
wherein, in the second position, the first piston adjusts the shifting element such that the second gearwheel is engaged with the shifting element;
wherein the control valve comprises a second piston adjustably arranged at least partially on the first piston and the second piston is adjustable by the power take-off shaft stub such that a movement of the first piston into the second position is blocked by the second piston; and
wherein the second piston comprises a first piston element, a second piston element, and a third piston element.

13. The agricultural vehicle of claim 3, wherein:
the first piston element is adjustably arranged at least partially in the first piston;
the second piston element is adjustably arranged at least partially in the first piston element; and
the third piston element is adjustably arranged at least partially in the second piston element.

14. The agricultural vehicle of claim 12, wherein the second piston element is mounted in the first piston element by a first restoring element.

15. The agricultural vehicle of claim 12, wherein the third piston element comprises a first and second piston part adjustably arranged in the second piston element.

16. The agricultural vehicle of claim 15, wherein a second restoring element is arranged between the first and second piston part.

17. The agricultural vehicle of claim 12, further comprising:
a first fluid conveyance bore and a second fluid conveyance bore defined in the output shaft;
wherein, a pressurized fluid is conveyed through the first fluid conveyance bore into the output shaft such that the first piston is moved into the first position;
wherein the pressurized fluid is conveyed through the second fluid conveyance bore into the output shaft such that the first piston is moved into the second position.

18. A power take-off shaft system for an agricultural vehicle, comprising:
an output shaft with a socket for a power take-off shaft stub located at one end of the output shaft, wherein the power take-off shaft stub is arranged at least partially in the socket;
a control valve arranged in the output shaft and including a valve bore extending axially from the socket into the output shaft;
a first piston adjustably arranged inside the valve bore in the output shaft;
a shifting element adjustably controlled by the first piston;
a first gearwheel and a second gearwheel disposed in engagement with the output shaft via the shifting element; and
a first fluid conveyance bore and a second fluid conveyance bore defined in the output shaft;
wherein the first piston is adjustable between a first position and a second position;
wherein, in the first position, the first piston adjusts the shifting element such that the first gearwheel is engaged with the shifting element and a pressurized fluid is conveyed through the first fluid conveyance bore into the output shaft;
wherein, in the second position, the first piston adjusts the shifting element such that the second gearwheel is engaged with the shifting element and the pressurized fluid is conveyed through the second fluid conveyance bore into the output shaft;
wherein, the control valve comprises a second piston adjustably arranged at least partially on the first piston and the second piston is adjustable by the power take-off shaft stub such that a movement of the first piston into the second position is blocked by the second piston.

19. A power take-off shaft system for an agricultural vehicle, comprising:
an output shaft with a socket for a power take-off shaft stub located at one end of the output shaft, wherein the power take-off shaft stub is arranged at least partially in the socket;
a control valve arranged in the output shaft and including a valve bore extending axially from the socket into the output shaft;
a first piston adjustably arranged inside the valve bore in the output shaft;
a shifting element adjustably controlled by the first piston;
a first gearwheel and a second gearwheel disposed in engagement with the output shaft via the shifting element; and
a first fluid conveyance bore defined in the output shaft;
wherein the first piston is adjustable between a first position and a second position;
wherein, in the first position, the first piston adjusts the shifting element such that the first gearwheel is engaged with the shifting element;
wherein, in the second position, the first piston adjusts the shifting element such that the second gearwheel is engaged with the shifting element;
wherein a pressurized fluid is conveyed through the first fluid conveyance bore into the output shaft such that the first piston is moved into the first position; and
wherein the control valve comprises a second piston adjustably arranged at least partially on the first piston and the second piston is adjustable by the power take-off shaft stub such that a movement of the first piston into the second position is blocked by the second piston.

20. The power take-off shaft system of claim 19, further comprising a second fluid conveyance bore in the output shaft, wherein the pressurized fluid is conveyed through the second fluid conveyance bore into the output shaft such that the first piston is moved into the second position.

21. The power take-off shaft system of claim 19, wherein the second piston comprises a first piston element, a second piston element, and a third piston element, wherein the first piston element is adjustably arranged at least partially in the first piston, wherein the second piston element is adjustably arranged at least partially in the first piston element, and wherein the third piston element is adjustably arranged at least partially in the second piston element.

22. The power take-off shaft system of claim 19, wherein the second piston comprises a first piston element, a second piston element, and a third piston element, and wherein the second piston element is mounted in the first piston element by a first restoring element.

23. The power take-off shaft system of claim 19, wherein the second piston comprises a first piston element, a second piston element, and a third piston element, and wherein the third piston element comprises a first and second piston part adjustably arranged in the second piston element.

24. The power take-off shaft system of claim 23, wherein a second restoring element is arranged between the first and second piston part.

\* \* \* \* \*